C. W. GRAHAM.
SOLDERING MACHINE.
APPLICATION FILED JUNE 11, 1903.
924,453.
Patented June 8, 1909.
7 SHEETS—SHEET 1.
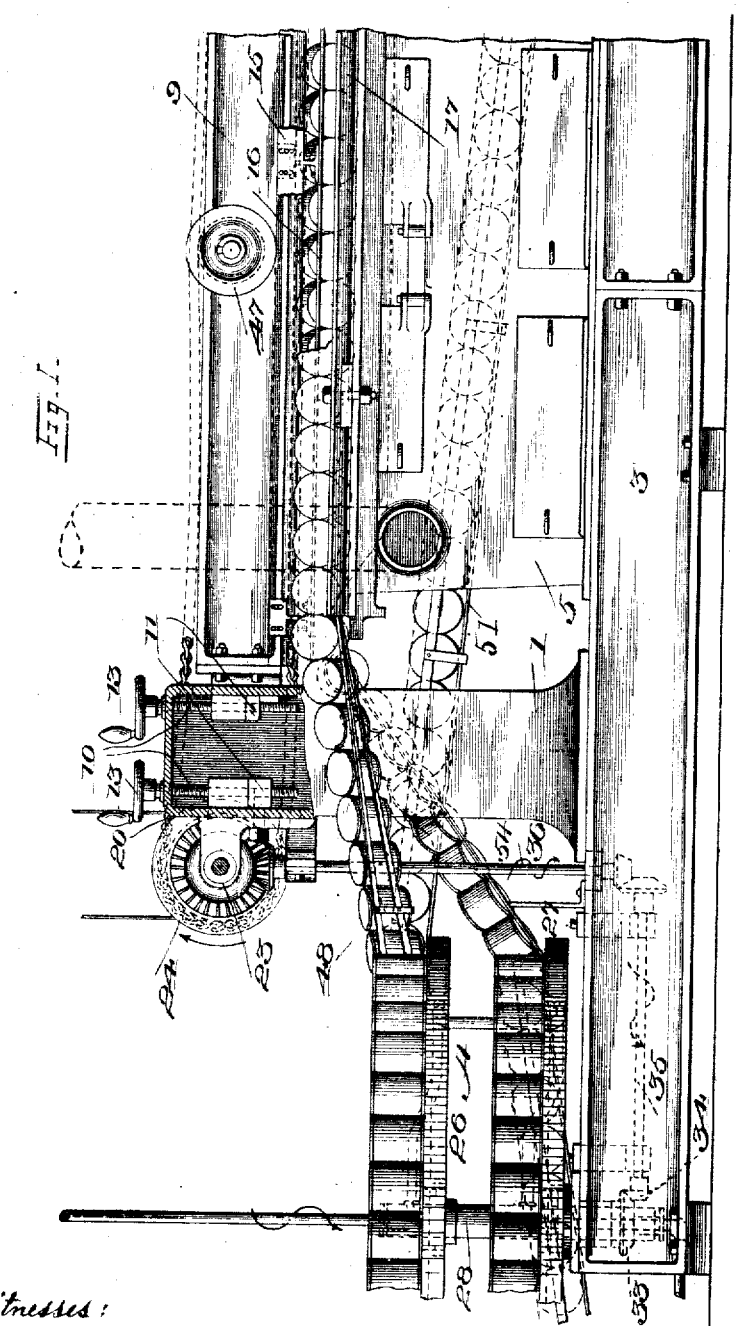

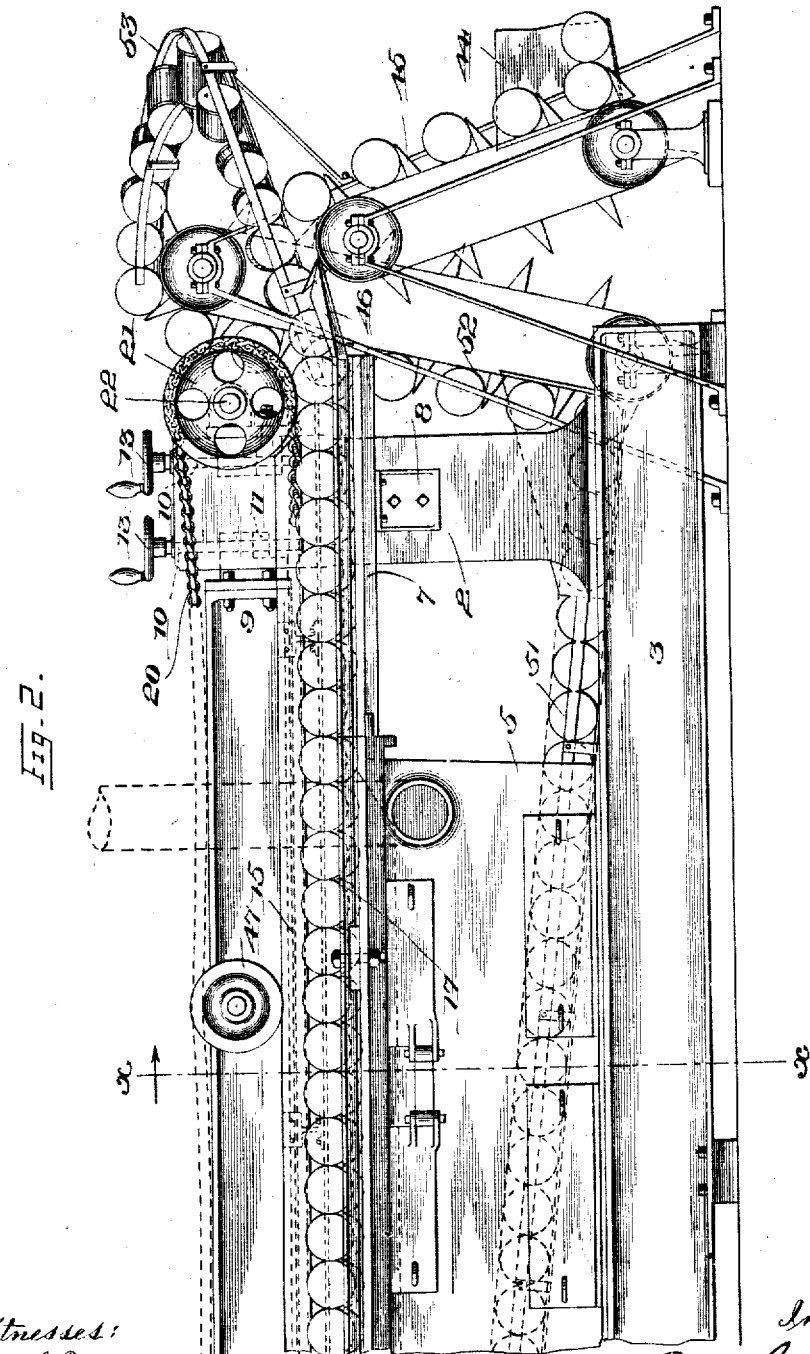

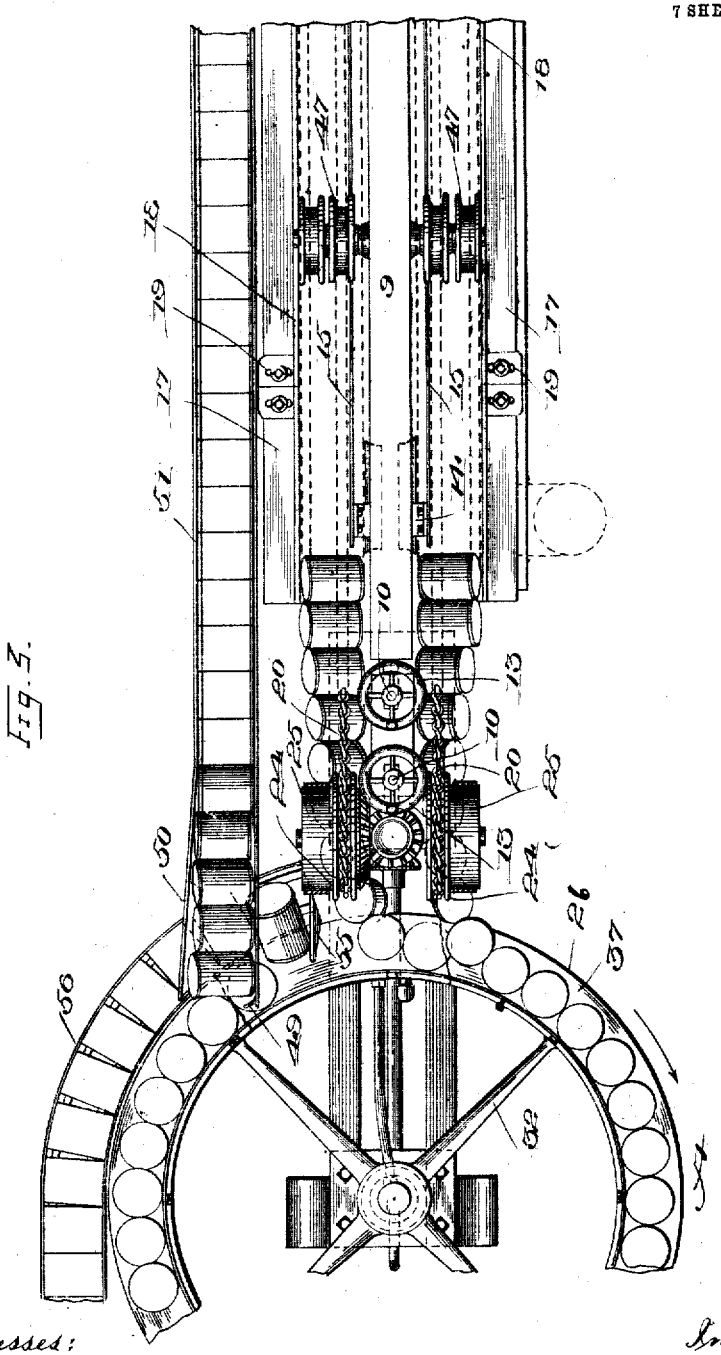

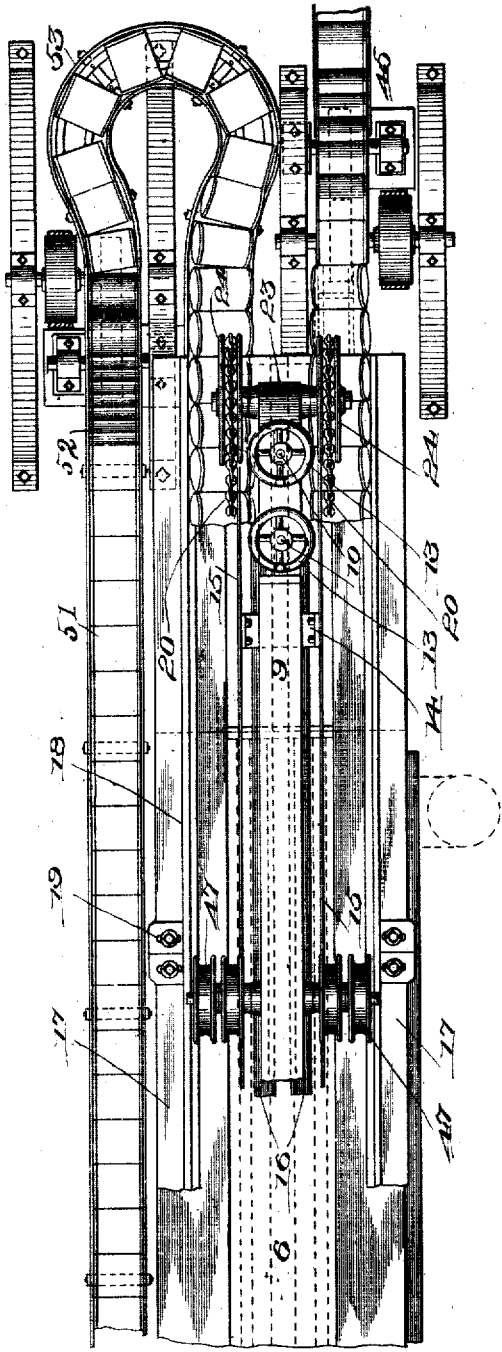

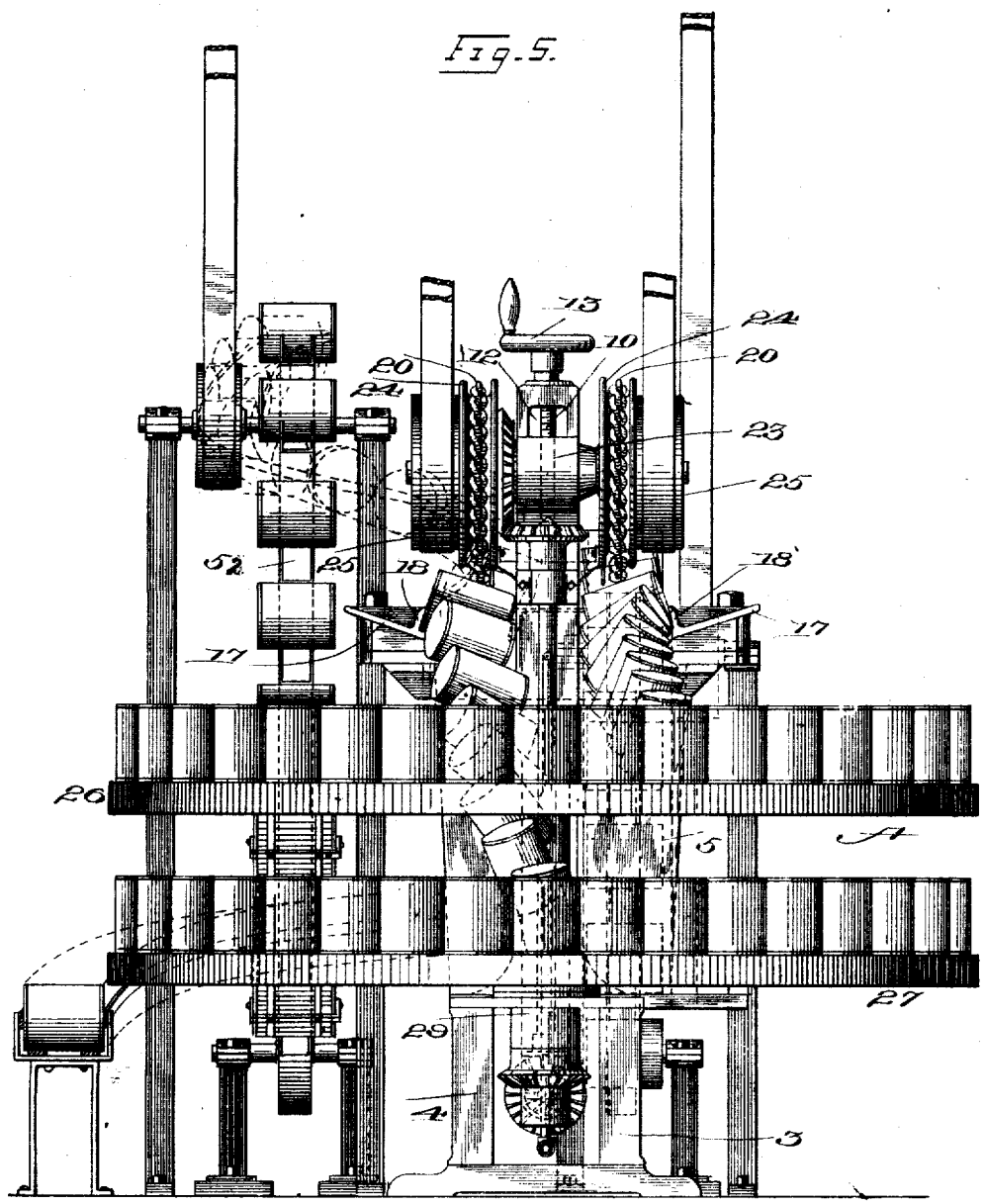

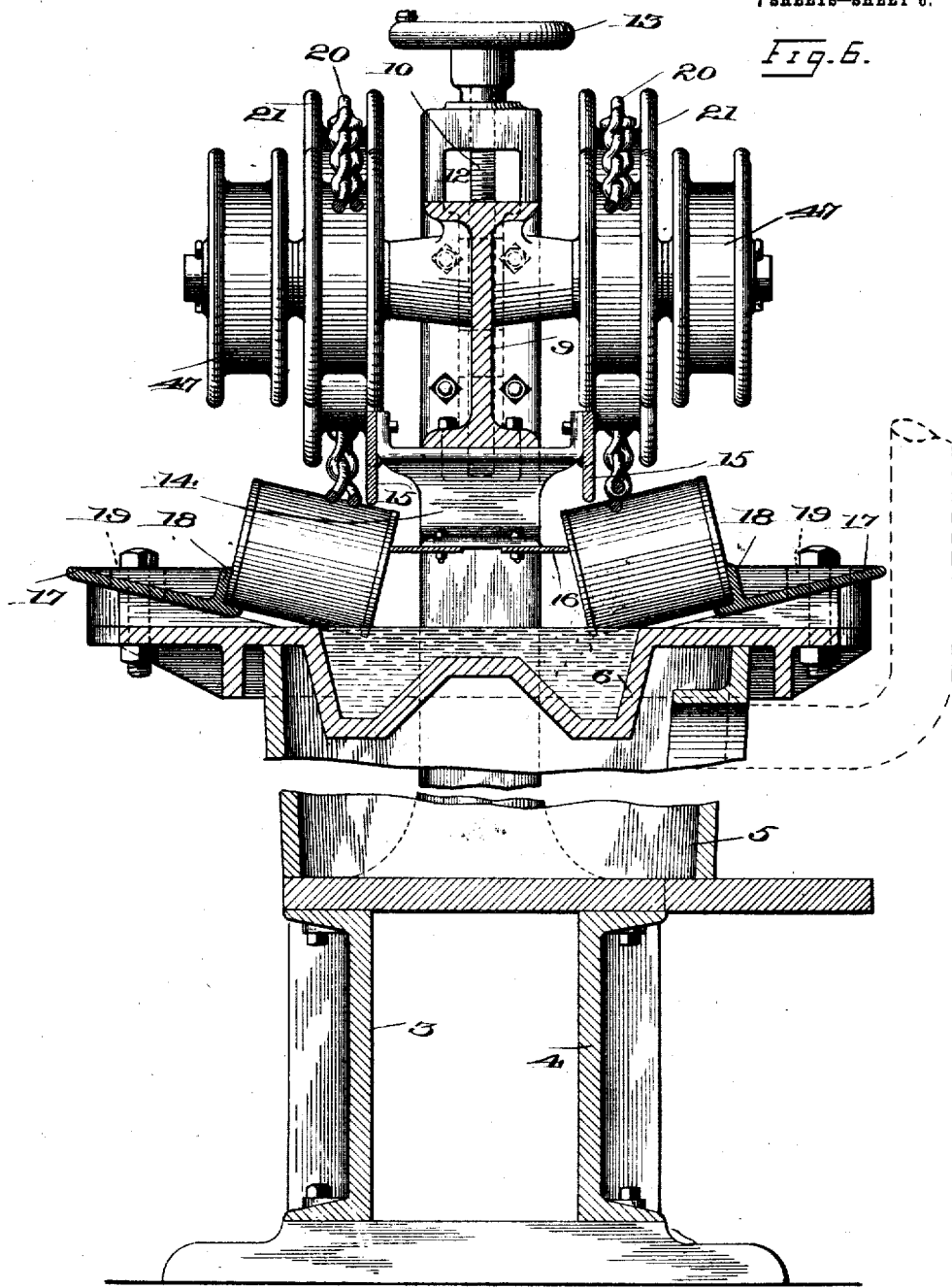

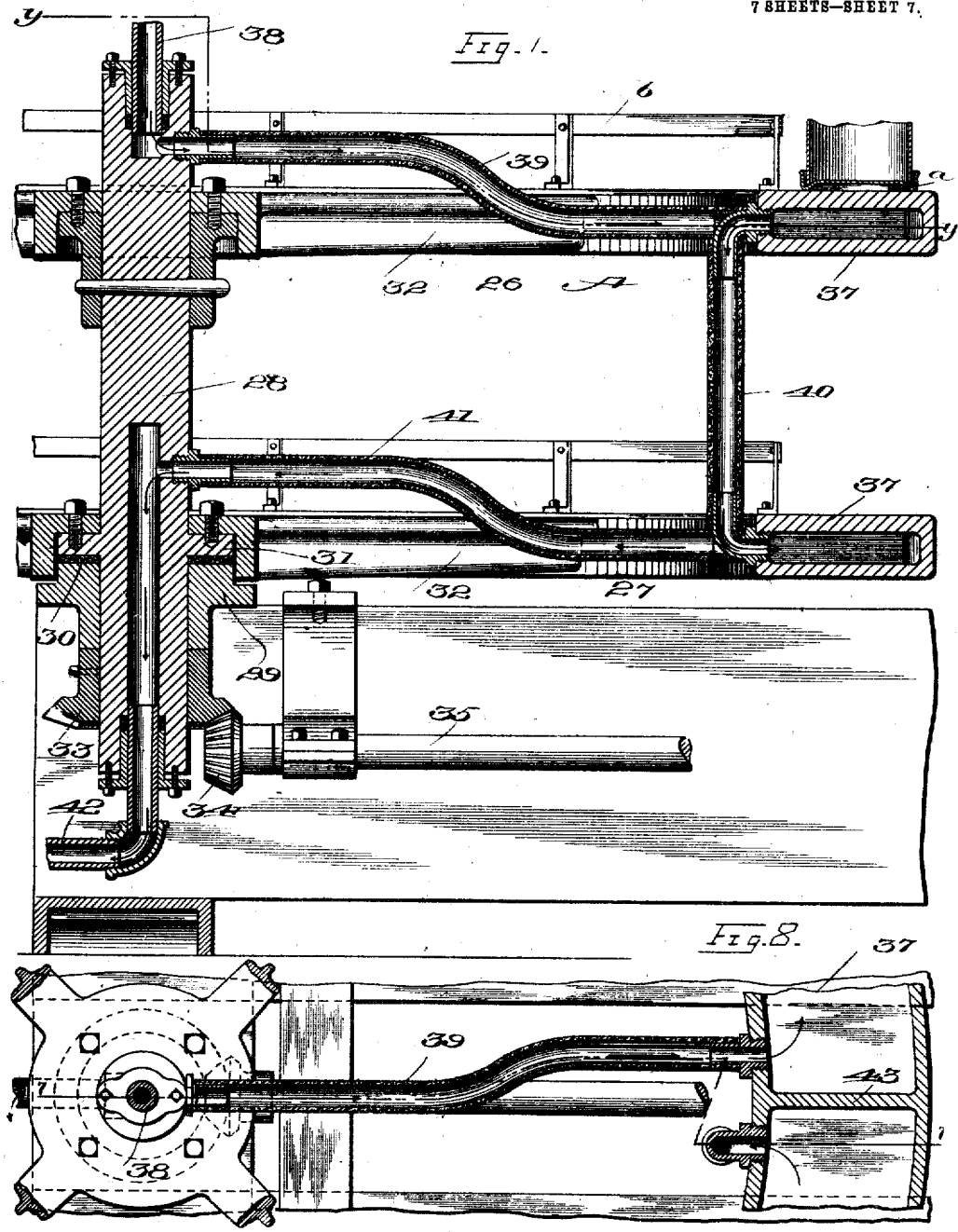

UNITED STATES PATENT OFFICE.

CHARLES W. GRAHAM, OF ROME, NEW YORK, ASSIGNOR TO UTICA INDUSTRIAL COMPANY, OF ROME, NEW YORK, A CORPORATION OF NEW YORK.

SOLDERING-MACHINE.

No. 924,453.  Specification of Letters Patent.  Patented June 8, 1909.

Application filed June 11, 1903. Serial No. 160,973.

*To all whom it may concern:*

Be it known that I, CHARLES W. GRAHAM, residing at Rome, in the county of Oneida and State of New York, have invented certain new and useful Improvements in Soldering-Machines, of which the following is a full, clear, and exact description, such as will enable others skilled in the art to which it appertains to make and use the same.

The invention relates to a soldering machine especially adapted for applying and setting solder on tin cans, but capable of use both as to generic and specific features thereof in a variety of relations. In general, its object is to provide a simple, durable and efficient machine of this character.

Specific objects and advantages will be, in part obvious from the following description, and in part pointed out.

The invention consists in the features of construction, combinations of elements, arrangement of parts and means for the application of principles which will be hereinafter described and the novel features thereof pointed out in the claims.

In the accompanying drawings, which illustrate an embodiment of my invention, Figure 1 is a side elevation, partly broken away, showing the solder setting end of the machine and a portion of the solder applying devices. Fig. 2 is a similar side elevation of the end of the machine to which the unsoldered cans are fed. Figs. 3 and 4 are top plan views of the parts shown in Figs. 1 and 2 respectively. Fig. 5 is an end elevation looking from the solder setting end of the machine. Fig. 6 is a section on the line X—X of Fig. 2 looking in the direction of the arrow. Fig. 7 is a vertical section, partially broken away, of the turntable or rotary conveyer embodying the solder setting means. Fig. 8 is a section on the line Y—Y of Fig. 7.

Similar reference characters refer to similar parts throughout the several views.

Referring first to the general framework of the machine, standards 1 and 2 are supported upon parallel channel beams or bed beams 3 and 4. On these bed beams is also supported a fire box 5 upon which is carried the solder bath 6 adapted to be filled with the soldering material which is rendered in proper shape for application to the cans upon application of heat, the fire box shown being only a conventional illustration for which any other heating appliance might be substituted. A flux bath 7 is also supported in the line of travel of the cans, as by brackets 8 attached to the standards 2. The paths or ways in the machine are of such construction that a line of cans may be carried along on each side of the machine, the appliances for this purpose being in the main duplicates unless otherwise specified. An I-beam 9 extends between the two standards 1, 2 and is vertically adjustable with reference thereto by means of feed screws 10 which pass through feed nuts 11 tapped into bosses projecting from the ends of the I-beam through longitudinal slots 12 in the sides of the standards. These feed screws are conveniently provided with hand wheels 13 by turning which the height of the I-beam relative to the standards and to the independently supported solder bath may be adjusted.

At intervals along the lower flange of the I-beam 9 are secured brackets 14, best shown in Fig. 6, to the sides of which are secured, preferably so as to be adjustable thereto, long plates or bars 15 which act as top guides for the movement of the cans in their passage through the machine. On each side of the lower edges of these castings are secured, preferably adjustably, horizontal plates or bars 16 which act as guides or stops for the inner ends of the line of cans. Guides or ways for the outer ends of the cans are provided by the plates 17 having vertical ribs 18 spaced slightly from their inner edges and secured to the top of the bath 6, preferably by bolts passing through longitudinal slots, as at 19. It will be clear that there are thus provided ways or guides for the cans as they are passed through the machine, which may be independently adjusted with reference to their supports, while the supports themselves with the top and inner end guides may be adjusted as a whole through the adjustment of the I-beam 9. At the same time the top and inner guides are supported independently of the solder bath and hence are relieved from the unfavorable effects of the contraction and expansion of such bath in use. The cans are rolled through the bath on each side of the machine by means of conveyer chains 20 which at the receiving end of the machine pass over idler sheaves 21 carried by a stud 22, a boss 23 projecting from which passes through a longitudinal slot in the standard 2 and is adjustable with reference thereto by means of a feed screw 10 and hand wheel 13 similar to the adjustment of the I-beam already described. On the other end of the machine chain sheaves 24, 24 are associated with driving pulleys 25 which are driven by belts from any suitable source of power, the vertical position of the sheaves being adjustable in order that the travel of the chains may correspond to the position of the adjustable guides, by a similar feed screw and feed nut adjustment, as at 10, 13.

The means for setting or solidifying the solder which is taken up by the joint between the can body and the head in the passage of the can through the solder bath comprises what may be termed a rotary turntable or conveyer, designated in a general way by A and provided with two decks or tables 26, 27. The specific construction of the turntable will be clear upon inspection of Figs. 7 and 8. A vertical shaft or elongated hub 28 is journaled in a vertical bearing 29, a washer 30 being interposed between the upper face of such bearing and an annular flange 31 on the hub on which the spokes 32 of the tables, which are, in the construction illustrated, of spider form, are bolted. The turntable is driven by the bevel gear 33 on the lower end of the hub 28, meshing with gear 34 on shaft 35, the shaft 35 being driven, as best shown in Fig. 1, by a vertical shaft 36 which is driven by bevel gears from one of the driving sheaves 24. The spokes 32 of the turntable carry at their ends two hollow annular rings or tracks 37 which form ledges or conveyers for the line of cans as they are fed from the solder bath. Suitable side rails may be provided, if desired, an inner rail being shown at b. Cold water or any desired cooling medium may be led through these hollow ledges from the inlet pipe 38 and the connecting pipes 39, 40, 41 to the outlet pipe 42 in the lower end of the hub. Between the inlet and outlet pipes in each ring is placed a barrier or deflector 43 by which the entering current of cold water or other cooling medium is deflected and caused to traverse practically the entire periphery of the ring before it is discharged through the outlet pipe.

Further details and advantages of the construction of this machine will be clear upon tracing the passage of a line of cans therethrough.

The unsoldered cans which have had the heads applied thereto by compression or otherwise are picked up from the receiving chute 44 by means of a conveyer 45 driven from any suitable source of power, as by pulley and belt shown in Fig. 4, and carried to an inclined stripper 46 by which they are taken from the conveyer and down which they roll until they are picked up by the conveyer chains on the left side of the machine looking from the feeding in end. This chain, which may, if desired, pass over additional idler sheaves 47, 47 carries the cans through the flux and solder baths and finally discharges them to an inclined way 48, down which they are rolled until they are received on the upper deck of the turntable. This rotates in the direction of the arrow in Figs. 1 and 3 and they are carried around thereby until they are turned aside by a deflector 49 which, acting in conjunction with a guide 50, discharges them upon the upper end of an inclined chute 51 down which they roll until they are picked up, by a conveyer 52 positioned, as best shown in Fig. 4 of the drawings, at the feeding in end of the machine and delivered to the inclined track 53 down which they roll until they are picked up by the conveyer chain at the right side of the machine for passage through the flux and solder baths, the cans being now reversely arranged with relation to the bath so that the flux and solder are applied to the opposite end from before. After leaving the conveyer chains at the opposite end of the machine, they are fed down an inclined way 54 to the lower deck 27 of the turntable, by which they are carried around until picked off by a deflecting arm 55 and delivered to a chute 56, whence they may be carried to any suitable point.

A very notable and important feature of my invention consists in the employment of means whereby the cans after leaving the solder bath may be subjected to the influence of a cooling medium, the effect of which shall be first exerted upon the end of the cans and thereafter progressively from the end toward the center. Hitherto the solder has been set at the joint either as a whole or by a cooling medium, the effect of which is exerted upon a part only of the desired surface as by a cold air blast directed against chains upon which a line of cans is carried. In either of these cases the solder does not set evenly, and when, as often happens, the solder at the side of the joint nearest the center of the can body is exposed to the effect of the cooling medium and sets before the solder in that part of the joint nearest the end has become set, air bubbles will be formed and an imperfect joint result, because of which the efficiency of the can as a preserving receptacle will be lessened if not totally destroyed. The action of the cooling means constructed in accordance with my present invention differs radically from such cooling devices and others which have been heretofore proposed in that it provides for applying the cooling medium to the solder progressively from the annular edge of the can or concealed part of the joint inward or toward the center of the can body. This may be made clear by inspection of Fig. 7, in which is shown a sectional view of a can resting upon the hollow ledge 37, the joint between the can body and heads being exaggerated for purposes of illustration. Upon circulation of cold water or other cooling medium through the pipes and conduits of the turntable, the cans, as they are carried around by the turntable, will be exposed to the action of the low temperature caused thereby, which will be increased by the effect of the material of which the table is formed, it being preferably of somewhat thick cast iron. This ring will itself become cold in addition to acting as a conductor between the cooling medium circulating through the turntable and the can resting on its upper surface. As the can with the solder in a semi-liquid condition in the joint between the body and head, as shown at Fig. 7, is deposited upon the turntable, the lowering of temperature will first affect the lower side of the joint which is nearest to and rests upon the hollow ledge, as at a. This will cause the solder to set at the bottom of the joint first and as the lowering of temperature gradually increases from the bottom upward the solder will then be set from the bottom upward. Practical tests have proved the efficiency of such a solder setting means and it is not necessary that I should further elaborate the method or theory of operation in accordance with which the beneficial results set forth are obtained. It is my belief, however, that the beneficial results of progressively setting the solder in this way from the bottom upward are caused by the fact that the air is squeezed out by the progressive solidification so that no air bubbles remain to endanger the life of the joint, while if the cooling medium is applied to a part only of the joint, or from the top downward, or to all the parts of the joint at once, there would be likely to be a solidification of the upper parts of the joint before the lower parts have solidified, thus rendering it likely that air bubbles would be caught and held within the joint. The same theory would apply to the formation of soft spots and holes in the joint, whether filled with air or whether they were *vacua*. Where the cooling medium is applied to a point corresponding to the top of the joint, having reference to the form of joint shown in the drawing, or to all parts of the joint at once, the contraction caused by the setting of the solder will work in various directions throughout the joint and will tend to leave holes which would immediately or eventually destroy its usefulness. Where, however, the solidification is progressive from the bottom or concealed part of the joint upward or outward, the initial contraction of the solder draws in the liquid solder, thereby filling up any holes which might be caused by the contraction and insuring a solid, closely packed joint. Looking at it from this viewpoint, the essential feature is that the effects of the contraction should all be exerted in one direction rather than, as in the case of methods heretofore proposed, being exerted in various directions throughout the mass which would tend to pull the particles apart instead of setting them together into a compact body. While this may not be the correct theory of the operation of the machine in this respect, the principle of the invention and the mode of carrying it out will be sufficiently clear from the description given and I do not intend to limit myself to any technical theory of operation.

It will be obvious, also, that the invention is not limited to the details of construction herein set forth, as various changes might be made without departing from the spirit of my invention. As, the driving means, the means whereby various parts are adjusted, means for timing the movement of the various parts, and the means for conveying the cans from one part of the machine to another may be varied, together with other features, which, while they might materially change the appearance of the machine would still involve the ideas and utilities which are here set forth, easily deduced from the description or inherent in the invention. I desire that all matter in the foregoing description shall be interpreted as illustrative and not in a limiting sense. It will also be clear that the parts and operations herein described may be identified by the use of various terms and that the terminology used is descriptive rather than limiting.

Having described my invention, what I claim as new and desire to secure by Letters Patent is:—

1. In a can soldering machine, means for applying solder to the joint of a can body and head and means for progressively lowering the temperature of said solder from the concealed, toward the exposed portions of said solder.

2. In a solder setting device for cans and similar articles, in combination, a table to which cans are supplied from the solder bath, means for rotating the table and means for cooling the part of the table upon which the cans rest and with which they move.

3. In a solder setting device for cans and similar articles, a rotary turntable to which the cans are supplied, said turntable having passages or conduits therein for the passage of a cooling medium beneath the line of travel of the cans.

4. In a can soldering machine, in combination, a solder bath, means for feeding a line of cans through said bath, a rotary turntable to which the cans are delivered from the solder bath, means for revolving said table and subjecting the solder at the joint to the influence of a cooling medium during such rotation, means for feeding the cans again through a solder bath with the opposite joint exposed to the solder, a turntable to which the cans are then fed, means for rotating said table, and means adapted to bring a cooling fluid into operative relation to said table.

5. In a machine of the class described, a turntable having a plurality of decks or tracks, conduits in said decks for the passage of a circulating medium therethrough, means for feeding articles successively to different decks of said table, and means for rotating said table.

6. In a machine of the class described, in combination, a turntable having a plurality of decks or tracks, means for feeding articles successively to different decks of such table and for rotating said table, and means for cooling the part or parts of the decks upon which the cans are adapted to rest.

7. In a can soldering machine, in combination with a solder bath and means for feeding the cans therethrough, a turntable having a plurality of decks, means for feeding cans from the solder bath to one of said decks and for subjecting the cans to the action of a cooling medium thereon, and means whereby the cans may be then fed again through a solder bath and to a second deck of the turntable for further action by a cooling medium.

8. In a can soldering machine, in combination with a solder bath and means for feeding the cans therethrough, a turntable having a plurality of decks, means for feeding cans from the solder bath to one of said decks and for subjecting the cans to the action of a cooling medium thereon, and means whereby the cans may be then fed again through a solder bath and to a second deck of the turntable for further action by a cooling medium, the construction and arrangement being such that a continuous line of cans may be fed through the solder bath and to the various decks of the turntable at the same time, whereby a continuously and automatically operating machine is obtained.

9. In combination, a cooling member provided with means adapted to receive a cooling fluid, means adapted continuously to supply cans to said cooling member, and means adapted to remove said cans after resting thereon in fixed relation thereto for a predetermined time.

10. In combination, a cooling member provided with means adapted to receive a cooling fluid, means adapted continuously to supply cans to said cooling member, and means adapted automatically to remove said cans after resting directly thereon in fixed relation thereto for a predetermined length of time.

11. In combination, a cooling member provided with means adapted to receive a cooling fluid, means adapted continuously to supply cans thereto, and means adapted automatically to remove said cans after resting upon said cooling member in fixed relation thereto for a predetermined length of time.

12. In combination, a cooling member provided with means adapted to receive a cooling fluid, means adapted continuously to feed cans thereto, and means adapted to remove said cans after resting directly upon said cooling member for a predetermined length of time.

13. In combination, a bed, a supporting member upon said bed, a solder bath mounted upon said supporting member, means adapted to conduct cans past said solder bath and in contact therewith, a second supporting member mounted upon said bed, guides secured to said second supporting member and independent of said first supporting member adapted to guide said cans in such passage, a cooling member, means adapted continuously to conduct said cans upon said cooling member, and means adapted automatically to remove said cans therefrom after remaining in contact therewith for a predetermined length of time.

14. In combination, a bed, a supporting member thereon, a solder bath mounted upon said supporting member, means adapted to conduct cans past said bath and in contact therewith, a second supporting member mounted upon said bed, guides adjustably mounted upon said second-supporting member and independent of said first supporting member adapted to guide said cans in such passage, a cooling member, means adapted to feed said cans to said cooling member, and means adapted to remove said cans from said cooling member after resting thereon for a predetermined length of time.

15. In combination, a bed, a supporting member thereon, a solder bath mounted upon said supporting member, means adapted to conduct cans past said bath and in contact therewith, a second supporting member mounted upon said bed, guides adjustably mounted upon said second supporting member and independent of said first supporting member adapted to guide said cans in such passage, a cooling member, means adapted continuously to feed said cans to said cooling member, and means adapted automatically to remove said cans after resting directly upon said cooling member for a predetermined length of time.

16. In apparatus of the class described, in combination, a pair of solder baths, means adapted to feed cans through one of said baths, a rotary cooling-table comprising two superimposed parts, means adapted to discharge cans from said last-mentioned bath upon one part of said cooling-table, means adapted to receive cans from said part of said cooling-table and feed the same through the other of said baths, and means adapted to discharge cans from said last-mentioned bath upon the remaining part of said cooling-table.

17. In apparatus of the class described, in combination, solder applying means, means adapted to feed cans in operative relation to said solder applying means, a rotary cooling table comprising two superimposed parts, means adapted to discharge cans from said soldering means upon one part of said cooling table, means adapted to receive cans from said part of said cooling table and feed the same through said solder applying means, and means adapted to discharge cans from said solder applying means upon the remaining part of said cooling table.

18. In a soldering machine, in combination, a solder bath, means adapted to roll cans in operative relation to said bath in an inclined position, and guiding means unconnected with said bath or its contents adapted to engage the upper part of said cans during their travel through said bath.

19. In a soldering machine, in combination, a solder bath, means adapted to roll cans through said bath in an inclined position, and guiding means unconnected with said bath or its contents adapted to engage both the ends and upper sides of the cans during their travel through said bath.

20. In apparatus of the class described, in combination, a solder bath, a bodily adjustable member bridging over said bath, means adapted to propel cans in operative relation to said bath, and means mounted upon said bridging member adapted to guide the cans in their travel with respect to said bath.

21. In apparatus of the class described, in combination, a solder bath, a bodily adjustable member bridging said bath in a direction lengthwise thereof, and means mounted upon said member adapted to propel cans through said bath and in operative relation thereto.

22. In apparatus of the class described, a solder bath, a bodily adjustable member bridging said bath, means mounted upon said member adapted to propel cans through said bath, and means mounted upon said member adapted to guide said cans in their travel with relation to said bath.

In testimony whereof I affix my signature, in the presence of two witnesses.

CHARLES W. GRAHAM.

Witnesses:
  HENRY J. COOKINHAM,
  SANFORD F. SHERMAN.